United States Patent
Alsop et al.

(10) Patent No.: US 11,042,484 B2
(45) Date of Patent: Jun. 22, 2021

(54) TARGETED PER-LINE OPERATIONS FOR REMOTE SCOPE PROMOTION

(71) Applicant: Advanced Micro Devices, Inc., Sunnyvale, CA (US)

(72) Inventors: Johnathan R. Alsop, Champaign, IL (US); Bradford Beckmann, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 15/192,542

(22) Filed: Jun. 24, 2016

(65) Prior Publication Data

US 2017/0371784 A1  Dec. 28, 2017

(51) Int. Cl.
| | |
|---|---|
| G06F 12/0897 | (2016.01) |
| G06F 12/0808 | (2016.01) |
| G06F 12/0811 | (2016.01) |
| G06F 12/0842 | (2016.01) |
| G06F 12/0891 | (2016.01) |

(52) U.S. Cl.
CPC ...... *G06F 12/0897* (2013.01); *G06F 12/0808* (2013.01); *G06F 12/0811* (2013.01); *G06F 12/0842* (2013.01); *G06F 12/0891* (2013.01); *G06F 2212/6042* (2013.01)

(58) Field of Classification Search
None
See application file for complete search history.

(56) References Cited

U.S. PATENT DOCUMENTS

| | | | | |
|---|---|---|---|---|
| 8,224,977 B2* | 7/2012 | Loaiza | ................... | G06F 9/526 370/431 |
| 9,898,350 B2* | 2/2018 | Alexeev | ................... | G06F 9/52 |
| 2003/0236957 A1* | 12/2003 | Miller | ................ | G06F 12/0813 711/163 |
| 2007/0124545 A1* | 5/2007 | Blanchard | ............... | G06F 9/526 711/152 |

OTHER PUBLICATIONS

Orr, Marc, S., et al., "Synchronization Using Remote-Scope Promotion," ASPLOS, Mar. 14-18, 2015, 14 pages.
Wickerson, et al., "Remote-Scope Promotion: Clarified, Rectified, and Verified," 30th Annual ACM SIGPLAN Conference on Object-Oriented Programming, Systems, Languages, and Application, (OOPSLA), Oct. 2015, 17 pages.

* cited by examiner

*Primary Examiner* — Gary W. Cygiel

(57) ABSTRACT

A processing system includes one or more first caches and one or more first lock tables associated with the one or more first caches. The processing system also includes one or more processing units that each include a plurality of compute units for concurrently executing work-groups of work items, a plurality of second caches associated with the plurality of compute units and configured in a hierarchy with the one or more first caches, and a plurality of second lock tables associated with the plurality of second caches. The first and second lock tables indicate locking states of addresses of cache lines in the corresponding first and second caches on a per-line basis.

16 Claims, 7 Drawing Sheets

TARGETED PER-LINE OPERATIONS FOR REMOTE SCOPE PROMOTION

BACKGROUND

Description of the Related Art

Heterogeneous processing systems include combinations of entities such as central processing units (CPUs), graphics processing units (GPUs), accelerators, and corresponding caches and memories. The entities in a heterogeneous processing system can be organized based on an execution hierarchy and a corresponding memory hierarchy. For example, the OpenCL execution hierarchy includes a global memory implemented at the system level. The system includes multiple devices, such as CPUs or GPUs, which implement corresponding caches (such as L2 caches) that are connected to the global memory. Each device implements multiple compute units that include corresponding caches (such as L1 caches) that are connected to the device-level cache. A compute unit executes a work-group concurrently or in parallel with other work-groups executing on other compute units. A work-group includes multiple threads (which may also be referred to as work-items) and each compute unit includes multiple processing elements for executing the threads in a work-group concurrently or in parallel. The processing elements are connected to the cache in the compute unit.

Memory scopes are defined to enforce memory consistency guarantees at different levels in the memory hierarchy allowing programmers to optimize for low-latency synchronization at smaller scopes rather than requiring programmers to always use slower global synchronization, i.e., synchronization at a larger scope. For example, atomic operations that are assigned a work-group scope can be executed directly by the processing units and local L1 caches in a compute unit rather than being executed using the slower L2 caches or global memory. For another example, atomic operations that are assigned a device scope can be executed at the L2 cache rather than global memory. A global scope can be used to enforce memory consistency guarantees throughout the heterogeneous processing system by synchronizing at the global memory. Different memory scopes can be assigned to different operations so that memory consistency guarantees are only enforced at the relevant level. Both participants in a synchronization operation are required to use a memory scope that is wide enough to encompass the other, but not any wider.

BRIEF DESCRIPTION OF THE DRAWINGS

The present disclosure can be better understood, and its numerous features and advantages made apparent to those skilled in the art by referencing the accompanying drawings. The use of the same reference symbols in different drawings indicates similar or identical items.

DETAILED DESCRIPTION

Figure 1:
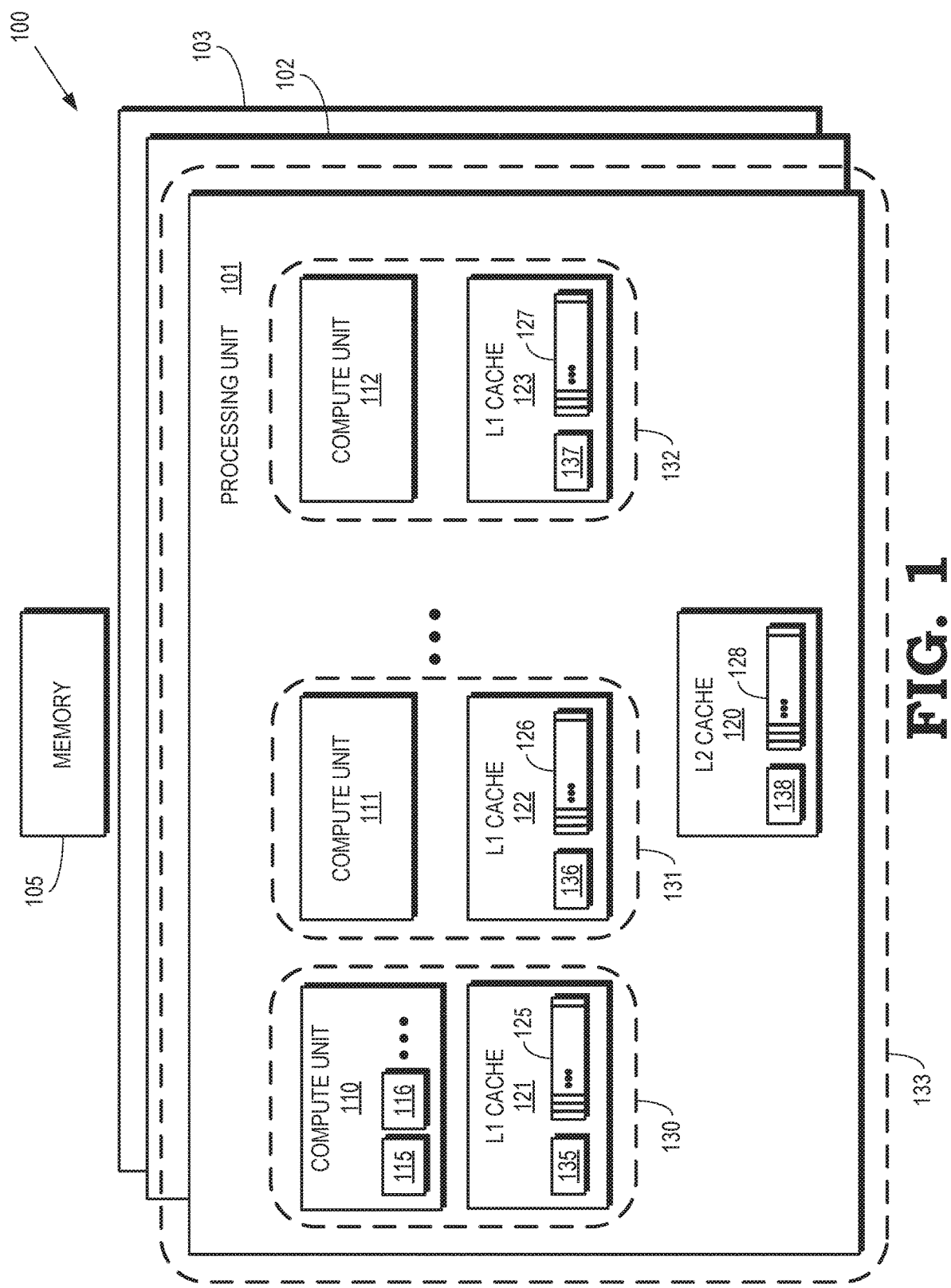
FIG. 1 is a block diagram of a processing system according to some embodiments.

The performance of a heterogeneous processing system can be improved by allowing idle threads in one work-group to "steal" tasks from a task queue of another work-group and execute the stolen task on a corresponding processing element. However, the requirements of work stealing and conventional memory scoping conflict with each other. For example, work stealing between two compute units will fail for threads that have been assigned a work-group scope for one of the compute units, regardless of the scope of the stealing compute unit, because synchronization fails unless both of the synchronized operations have scopes that encompass both compute units. Increasing the memory scopes of both compute units, e.g., from a work-group scope to a device scope, would allow work stealing between the two compute units but would incur a performance cost because the device scope would also be used for the majority of tasks that are not stolen.

Remote scope promotion uses global lock, flush, and invalidate commands to permit a remote processing element (or thread) to steal work from a local processing element (or thread) while preserving memory consistency. However, broadcasting global flush and invalidation commands causes more data to be flushed and invalidated than is necessary for the requirements of the memory model. The coarse granularity of the broadcast flush or invalidate commands also precludes potential parallel execution of sub-operations and piggybacking of broadcast messages. Global read-modify-write (RMW) locking of the L1 caches prevents execution of all RMW operations while the lock is held, even though RMW atomicity only requires that RMW operations to the same address in the L1 caches are blocked while changes to that address are propagated from/to remote threads before/after a corresponding store or RMW operation is performed at the L2 cache. A global lock also limits scalability because all lock requests are sent to a single global ordering point.

Conflict between memory scoping and work stealing can be reduced without incurring the costs of global data flushing, invalidation, or blocking of RMW operations using locking tables that indicate locking states of addresses of individual cache lines within caches in a heterogeneous processing system. Some embodiments of the heterogeneous processing system implement a plurality of processing units (such as CPUs or GPUs) that each include a plurality of compute units for concurrently executing work-groups. Each compute unit includes a plurality of processing elements for concurrently executing work items from the work-groups. First caches are associated with each of the plurality of processing units and second caches are associated with each of the plurality of compute units. The first and second caches are associated with corresponding lock tables that indicate the locking state of each address in the corresponding first or second cache. The heterogeneous processing system uses the locking tables to implement per-address lock, flush, invalidate, and RMW commands for the first and second caches. Some of the per-address lock, flush, or invalidate commands can be executed concurrently while still satisfying the requirements of the memory model. Entities in the heterogeneous processing system can steal work from other entities that have a different memory scope using the per-address lock, flush, invalidate, and RMW commands. For example, in some variations, store operations and RMW operations performed by work stealing entities in a remote memory scope modify data stored at addresses in a cache within the remote memory scope. The remote cache can be synchronized on a per-address basis with a cache within a local memory scope using the per-address lock, flush, invalidate, and RMW commands.

FIG. 1 is a block diagram of a processing system 100 according to some embodiments. The processing system 100 includes one or more processing units 101, 102, 103, which are collectively referred to herein as "the processing units 101-103." In some variations, the processing units 101-103 can be central processing units (CPUs), graphics processing units (GPUs), accelerated processing units (APUs), application-specific integrated circuits (ASICs), field programmable gate arrays (FPGAs), and the like. The processing system 100 can include more or fewer processing units 101-103. The processing system 100 also includes a memory 105 that can be accessed by the processing units 101-103. The memory 105 is used to store instructions for execution by the processing units 101-103, data to be used when executing instructions, or data representing the results of the executed instructions.

The processing unit 101 includes compute units 110, 111, 112 that are collectively referred to herein as "the compute units 110-112." Although not shown in FIG. 1 in the interest of clarity, the processing units 102, 103 also include compute units that operate in substantially the same manner as the compute units 110-112. The compute units 110-112 are configured to execute groups of instructions (known as work-groups) concurrently or in parallel. The compute unit 110 includes processing elements 115, 116 that are configured to execute work-items from the work-groups concurrently or in parallel. Although not shown in FIG. 1 in the interest of clarity, the compute units 111, 112 also include processing elements for executing work-items concurrently or in parallel.

The processing unit 101 also includes an L2 cache 120 and L1 caches 121, 122, 123 that are collectively referred to herein as "the L1 caches 121-123." The L2 cache 120 and the L1 caches 121-123 are used to store (or cache) copies of information stored in the memory 105. Memory transactions can be performed using the cached copy of the information instead of performing the memory transaction directly on the information stored in the memory 105. The L1 caches 121-123 are associated with corresponding compute units 110-112. For example, the L1 cache 121 is used to cache data or instructions used by the compute unit 110. The L2 cache 120 and the L1 caches 121-123 are configured as a cache hierarchy. In some variations, the cache hierarchy is inclusive so that copies of data stored in cache lines of the L1 caches 121-123 are stored in the higher level L2 cache 120. The processing elements 115, 116 therefore attempt to access information stored in the L1 cache 121 based on an address that indicates the location of the information in the memory 105. If the information is stored in a cache line of the L1 cache 121, a cache "hit," the processing elements 115, 116 can perform the memory transaction on the cached copy of the information. If the information is not stored in a cache line of the L1 cache 121, a cache "miss," the processing elements 115, 116 attempt to access information from the L2 cache 120. A cache miss to the L2 cache 120 causes the processing elements 115, 116 to access the information directly from the memory 105.

Some embodiments of the L2 cache 120 and the L1 caches 121-123 maintain synchronization first-in-first-out (FIFO) buffers 125, 126, 127, 128 to track addresses of cache lines that include dirty data. The FIFO buffers 125-128 can therefore be used to identify dirty data that needs to be written back to a higher level cache or memory, e.g., in the event that the corresponding cache is flushed.

Some variations of the L2 cache 120 and the L1 caches 121-123 are used to provide data synchronization between subsets of the processing elements 115, 116, the compute units 110-112, and the processing units 101-103. The subsets are referred to as "scopes" and threads executing on the processing units 101-103 can be assigned to different scopes. The term "data synchronization" is understood to mean that multiple entities within a scope can perform memory transactions on data stored at the same address in memory or cache and each entity within the scope is guaranteed to read a correct value of the data from the memory or cache that provides synchronization to the scope. The requirements for data synchronization can be specified by a memory model that is defined for the processing system 100. Data synchronization is maintained within a scope but data synchronization is not required to be maintained with entities that are outside the scope. For example, work-group scopes 130, 131, 132 (collectively referred to herein as "the work-group scopes 130-132") are defined to encompass the corresponding compute units 110-112 and L1 caches 121-123. The L1 cache 121 therefore maintains data synchronization between the processing elements 115, 116 in the compute unit 110 that is within the work-group scope 130. Memory transactions between the compute units 111, 112 and the corresponding L1 caches 122, 123 in the work-group scopes 131, 132 are not, however, synchronized with each other or with memory transactions performed by the processing elements 115, 116. For another example, the L2 cache 120 can be used to maintain data synchronization for a device scope 133, which encompasses the compute units 110-112 implemented on the processing unit 101. Other scopes encompassing more or fewer entities may also be defined.

Remote scope promotion is used to temporarily increase the scope associated with threads that are being executed by entities within the processing system 100. For example, threads on the processing elements 115, 116 can be made (or become) available to perform work stealing by executing tasks or work-items that are scheduled to be executed by processing units in the compute unit 111. If the work-items are part of a thread that has a work-group scope 131, the processing elements 115, 116 cannot perform work stealing because the threads executing within the work-group scope 130 are not guaranteed to be synchronized with the threads executing in the work-group scope 131. The scope associated with the threads can therefore be promoted to the device scope 133 using lock bits 135, 136, 137, 138, which are collectively referred to herein as "the lock bits 135-138." For example, the work stealing thread in the work-group scope 130 can acquire or "lock" the L1 caches 121-123 by setting the lock bits 135-137 to a locked value, e.g., of 1, so that only the threads in the work-group scope 130 can perform a memory transaction, such as a store or a read-modify-write (RMW) operation, to the L1 cache 121. Compute units 111, 112 are not permitted to perform memory transactions on the locked L1 caches 122, 123 until the work stealing thread releases the lock by unsetting the lock bits 135-137 to an unlocked value, e.g., of 0. The L1 caches 121-123 are flushed and invalidated to ensure synchronization via the L2 cache 120 during the remote scope promotion, as discussed below.

Figure 2:
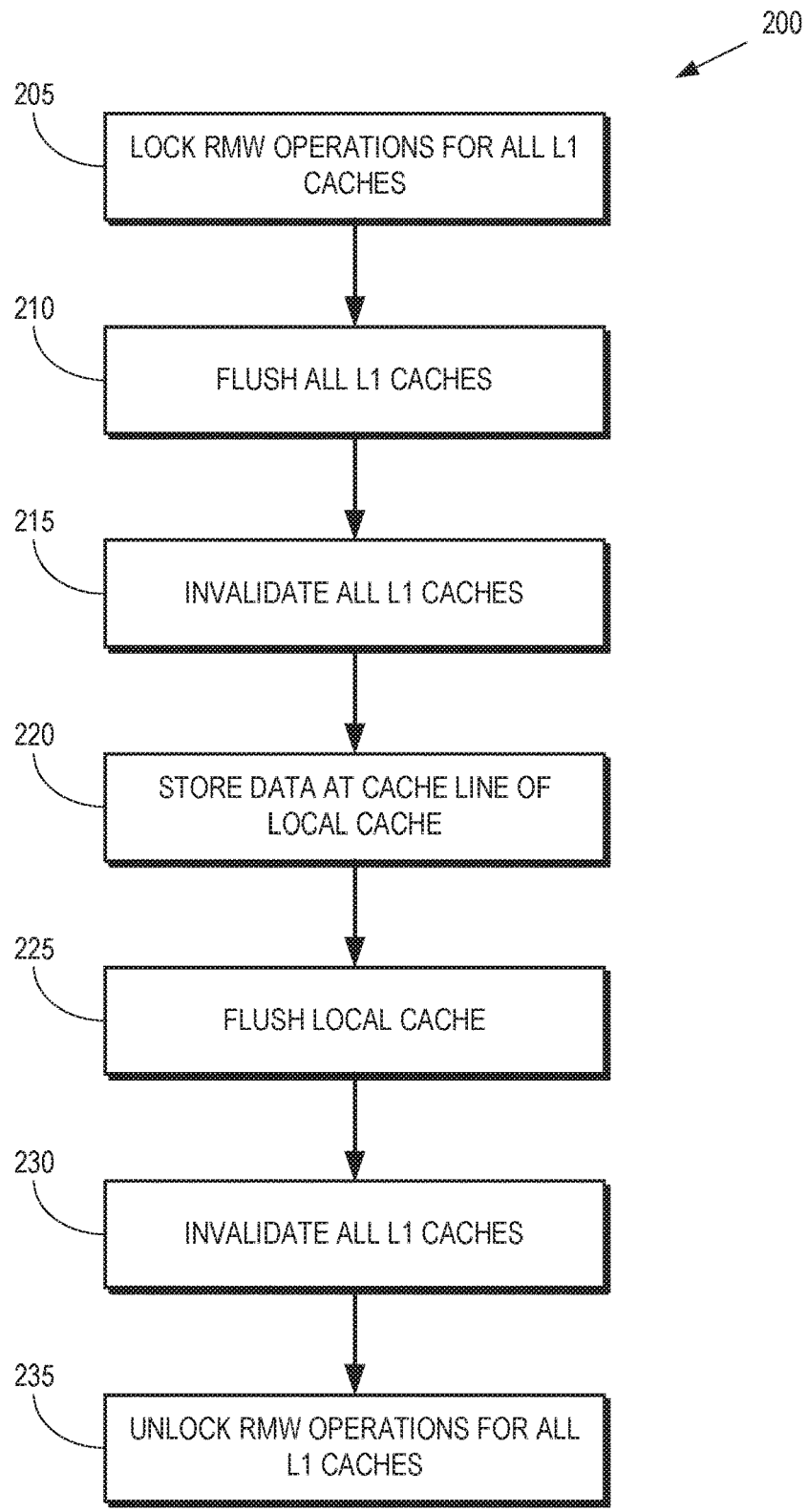
FIG. 2 is a flow diagram illustrating a method for implementing a remote device scope store operation according to some embodiments.

FIG. 2 is a flow diagram illustrating a method 200 for implementing a remote device scope store operation according to some embodiments. The method is implemented in some embodiments of the processing system 100 shown in FIG. 1. Memory model rules for the processing system define a release semantic that requires that the remote device scope store operation to a first address must ensure that all prior stores performed by the processing element that will perform the remote device scope store operation (referred to hereinafter as "the local core" or "the local processing element") are visible to all other processing elements (referred to hereinafter as "the remote cores" or "the remote processing elements") within the device scope. The memory model rules also require RMW atomicity, which requires that any RMW operations to the first address from the remote cores are propagated to the synchronizing cache, e.g., the L2 cache 120 for the device scope 133 shown in FIG. 1.

At block 205, the local core acquires all the RMW locks for local and remote caches that are associated with the local and remote cores within the device scope. The RMW locks can be acquired by setting lock bits for the cores such as the lock bits 135-137 for the L1 caches 121-123 shown in FIG. 1. In some variations, setting the lock bits is performed by changing the value of the lock bits, e.g., to a value of 1, in response to a broadcast global lock message.

At block 210, the local and remote caches that provide synchronization for the processing elements at the work-group scope are flushed so that any dirty data in the local remote caches is flushed to the higher-level cache that provides synchronization at the device scope. For example, L1 caches associated with the local and remote cores can be flushed to the L2 cache at the device scope. Flushing dirty data from the local and remote L1 caches ensures that the most up-to-date data is visible to all of the local and remote cores from the higher level, L2 cache.

At block 215, all valid data in the local and remote caches is invalidated. For example, valid data stored at all addresses of cache lines in the L1 caches is invalidated so that any memory transaction initiated by the corresponding local or remote cores to an address in the corresponding L1 cache will miss in the L1 cache and the core will be forced to access the corresponding cache line at the L2 cache level.

The memory model requires that the processes of blocks 210 and 215 be performed sequentially to satisfy the release semantic and RMW atomicity. If the processes of blocks 210 and 215 are not performed sequentially, the release semantic and RMW atomicity established by the memory model are not satisfied and stale data may be retrieved from the caches. For example, if thread 1 is executing on a local core and thread 2 is executing on a remote core, thread 1 can perform remote scope promotion (RSP) to store data at address x. Thread 1 and thread 2 could perform the following operations that do not obey the memory model because the flush (block 210) and the invalidate (block 215) operations are performed concurrently:

| thread 1 | thread2 |
|---|---|
| st a | |
| st b | |
| flu local start | invalidate done |
| flu a | load b (stale) |

| thread 1 | thread2 |
|---|---|
| flu b | |
| flu local done | |
| ST x RSP | |
| | load-acquire x WG |
| | load b (stale) |

In this example, flushing of the local cache (flu local) does not complete before invalidation of the remote cache is done. Once invalidation of the remote cache is done, subsequent attempts by thread 2 to access data from memory will miss at the remote cache and will therefore access the data from the higher-level cache, e.g., an attempt to load data from address b will be forced to load the data from the higher-level cache. However, in this example, the flush of data at address b from the local cache to the higher-level cache does not complete before thread 2 loads the data from the higher-level cache. Thread 2 can therefore load stale data from the address b into the remote lower level cache. Subsequent loads by thread 2 that are performed at the work-group (WG) scope, which is synchronized using the remote cache, can also load the stale data from the address b in the remote cache.

At block 220, the store operation is performed to store data at a cache line of the local cache. For example, the local core may store data at the cache line of the local L1 cache indicated by the first address.

At block 225, the local cache associated with the local core in the local work-group is flushed so that dirty data, including the data that has been stored at the first address in the local L1 cache, is written to the higher-level cache.

At block 230, the remote caches associated with the remote cores are invalidated so that the next attempt to access data stored at the first address (as well as other addresses in the remote caches associated with the remote cores) will miss in the corresponding remote cache. The remote cores will therefore access the data stored at the first address from the higher-level cache. Blocks 225 and 230 must therefore be performed sequentially (as required by RMW atomicity) to guarantee that the data accessed at the first address in the higher-level cache is up-to-date.

At block 235, locks for RMW operations performed by the local core and the remote cores are unlocked. For example, the RMW locks can be unlocked by unsetting lock bits for the cores such as the lock bits 135-137 for the L1 caches 121-123 shown in FIG. 1. In some variations, unsetting the lock bits is performed by changing the value of the lock bits, e.g., to a value of 0, in response to a broadcast global unlock command.

Figure 3:
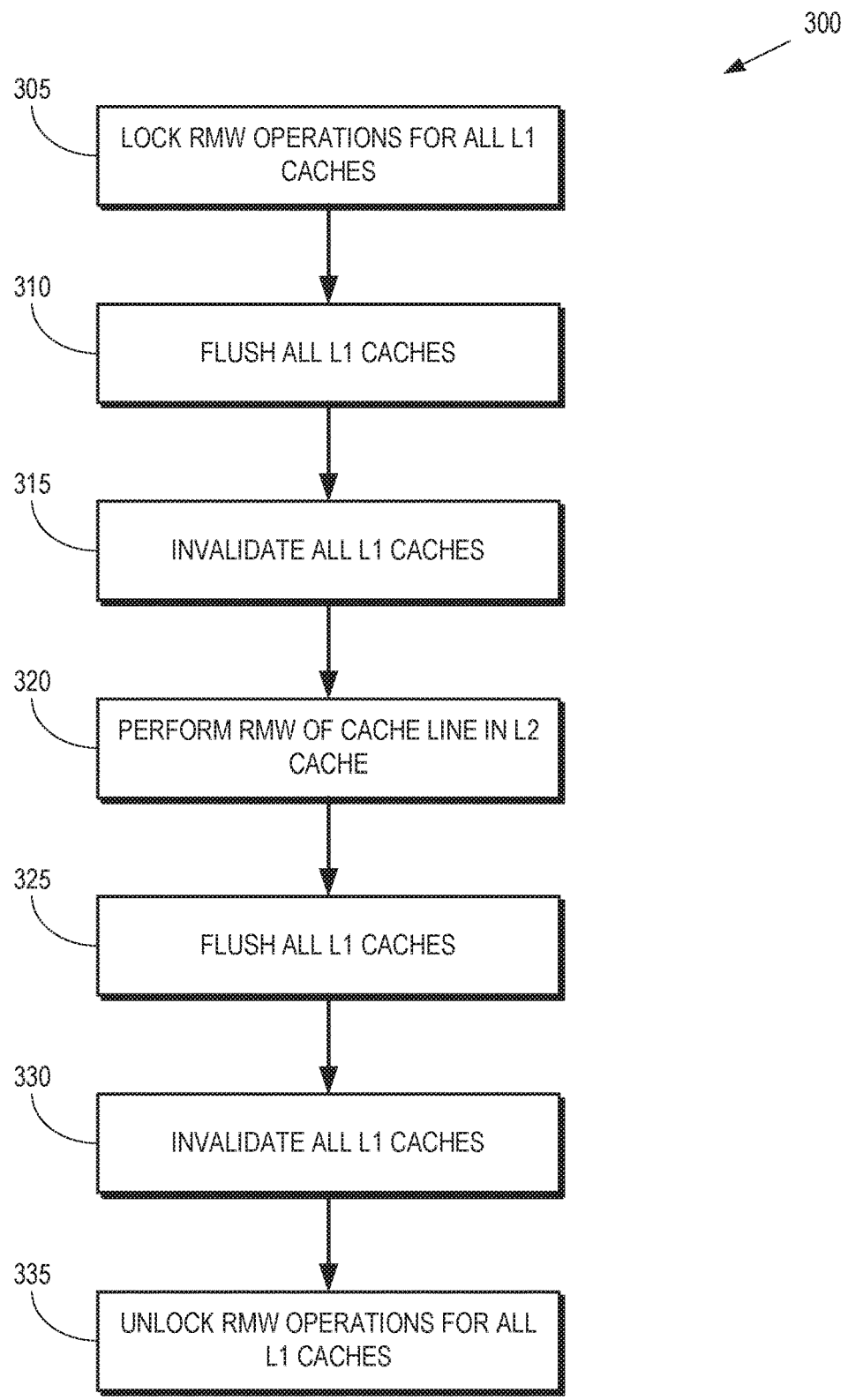
FIG. 3 is a flow diagram illustrating a method for implementing a remote device scope read-modify-write (RMW)-acquire operation according to some embodiments.

FIG. 3 is a flow diagram illustrating a method 300 for implementing a remote device scope RMW-acquire operation according to some embodiments. The method is implemented in some embodiments of the processing system 100 shown in FIG. 1. As discussed herein, memory model rules define a release semantic and RMW atomicity requirements. The memory model rules can also define an acquire semantic that requires that all dirty data at remote cores be made visible to the local core before releasing RMW locks. The remote device scope RMW-acquire command satisfies the acquire semantic. The sequence of flush and invalidate operations performed by method 300 therefore differ from the sequence performed in the method 200 shown in FIG. 2.

At block 305, the local core acquires all the RMW locks for the local and remote cores within the device scope. The RMW locks can be acquired by setting lock bits for the cores such as the lock bits 135-137 for the L1 caches 121-123 shown in FIG. 1. In some variations, setting the lock bits is performed by changing the value of the lock bits, e.g., to a value of 1, in response to a broadcast global lock command.

At block 310, the local and remote caches that provide synchronization for the processing elements at the work-group scope are flushed so that any dirty data in the local or remote caches is flushed to the higher-level cache that provides synchronization at the device scope. At block 315, all valid data in the local and remote caches is invalidated. For example, valid data stored at all addresses of cache lines in the local and remote L1 caches is invalidated so that any memory transaction initiated by the corresponding local or remote cores to an address in the L1 cache will miss in the corresponding L1 cache and be forced to access data at the L2 cache level. As discussed herein, the release semantics and RMW atomicity require that block 310 and 315 be performed sequentially.

At block 320, the RMW-acquire operation is performed to read, modify, or write data at a cache line of the higher level cache. For example, the local core can read, modify, or write data at the first address of the cache line of the L2 cache.

At block 325, the local and remote caches associated with the local core and the remote cores are flushed so that dirty data in any of the corresponding local and remote caches is written to the higher-level cache. Flushing the dirty data at the remote cores makes all data at the device scope visible to the local core, as required by the acquire semantics.

At block 330, the local and remote caches associated with the local core and the remote cores are invalidated. The RMW atomicity requires that the effects of the RMW-acquire operation performed at block 320 be propagated to the remote cores in the device scope before a subsequent RMW operation is performed by the local core. Blocks 325 and 330 must therefore be performed sequentially to guarantee that the data accessed at the first address in the higher-level cache is up-to-date.

At block 335, locks for RMW operations performed by the local core and the remote cores are unlocked. For example, the RMW locks can be unlocked by unsetting lock bits for the cores such as the lock bits 135-137 for the L1 caches 121-123 shown in FIG. 1. In some variations, unsetting the lock bits is performed by changing the value of the lock bits, e.g., to a value of 0, in response to a broadcast global unlock command.

Figure 4:
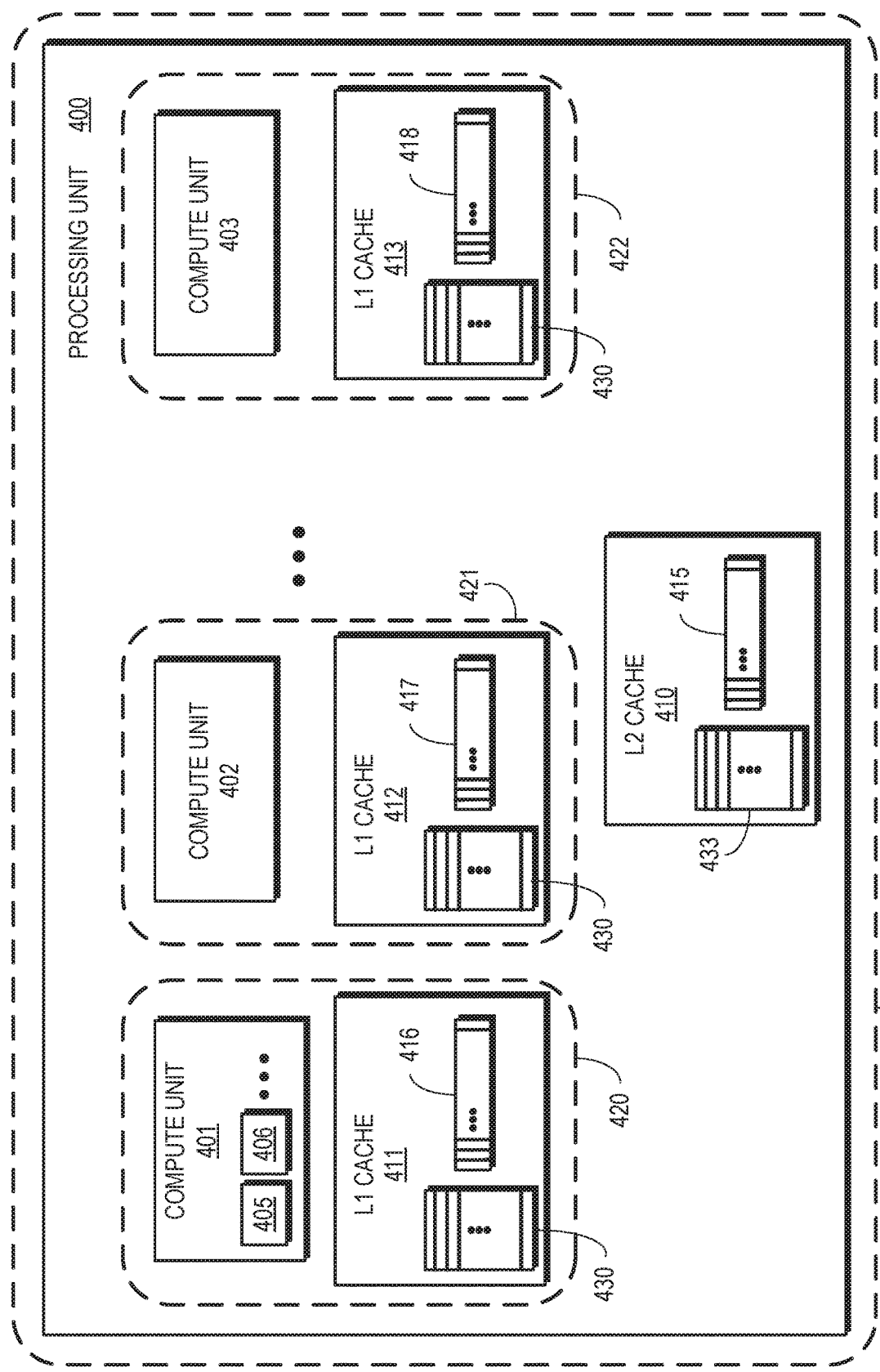
FIG. 4 is a block diagram of a processing unit according to some embodiments.

FIG. 4 is a block diagram of a processing unit 400 according to some embodiments. The processing unit 400 is used to implement some embodiments of one or more of the processing units 101-103 shown in FIG. 1. The processing unit 400 can be a CPU, a GPU, an APU, an ASIC, an FPGA, and the like. The processing unit 400 includes compute units 401, 402, 403 that are collectively referred to herein as "the compute units 401-403." The compute units 401-403 are configured to execute groups of instructions (known as work-groups) concurrently or in parallel. The compute unit 401 includes processing elements 405, 406 that are configured to execute threads (or work-items) from the work-groups concurrently or in parallel. Although not shown in FIG. 4 in the interest of clarity, the compute units 402, 403 also include processing elements for executing work-items concurrently or in parallel.

The processing unit 400 also includes an L2 cache 410 and L1 caches 411, 412, 413 that are collectively referred to herein as "the L1 caches 411-413." The L2 cache 410 and the L1 caches 411-413 are used to store (or cache) copies of information stored in an external memory such as the memory 105 shown in FIG. 1. Memory transactions can then be performed using the cached copy of the information instead of performing the memory transaction directly on the information stored in the external memory. The L1 caches 411-413 are associated with corresponding compute units 401-402. The L2 cache 410 and the L1 caches 411-413 can be configured as a cache hierarchy. Some variations of the cache hierarchy are inclusive so that copies of data stored in cache lines of the L1 caches 411-413 are stored in the higher level L2 cache 410. Some embodiments of the L2 cache 410 and the L1 caches 411-413 maintain synchronization FIFO buffers 415, 416, 417, 418 to track addresses of cache lines that include dirty data. The FIFO buffers 415-418 can therefore be used to identify dirty data that needs to be written back to a higher level cache or memory, e.g., in the event that the corresponding cache is flushed.

The compute units 401-403 in the processing unit 400 are grouped into different scopes such as work-group scopes 420, 421, 422 (collectively referred to herein as "the work-group scopes 420-422") and a device scope 425. Threads executing on the processing unit 400 can be assigned to different scopes. The L1 caches 411-412 provide data synchronization between the processing elements in the corresponding compute units 401-403 for threads that are operating in the work-group scopes 420-422. The L2 cache 410 provides data synchronization between the compute units 401-403 in the processing unit 400 for threads that are operating in the device scope 425.

The processing unit 400 implements per-line remote scope promotion to increase the scope of individual addresses of cache lines associated with threads that are being executed by entities within the processing unit 400. For example, the processing units 405, 406 can be made (or become) available to perform work stealing by executing tasks or work-items that are scheduled to be executed by processing units in the compute unit 402. Furthermore, the work-items can perform memory transactions on data stored at a predetermined address or in a predetermined set of addresses or address range. The scope associated with the threads can therefore be promoted to the device scope 425 for the predetermined address, set of addresses, or address range, while allowing the scope for other addresses to remain at the work-group scopes 420-422.

Per-line remote scope promotion may be implemented using locking tables 430, 431, 432, 433, which are collectively referred to herein as "the locking tables 430-433." Entries in the locking tables 430-433 indicate the locking states (e.g., locked or unlocked) of the cache lines in the corresponding caches 410-413. Threads may therefore acquire (or lock) individual lines by setting the locking state of the corresponding cache line to a value indicating that the line is locked. Threads can release (or unlock) individual lines, sets of lines, or lines corresponding to a range of addresses by unsetting the locking state of the corresponding cache line to a value indicating that the line is unlocked. For example, a work stealing thread in the work-group scope 420 can acquire or "lock" a line indicated by a first address in the L1 caches 411-413 by setting the locking state of the line in the locking tables 430-432 to a locked value, e.g., of 1, so that only the work-stealing thread can perform a memory transaction, such as a store or a read-modify-write (RMW) operation, on cache lines in the L1 caches 411-413 that are indicated by the first address. Other threads executing in the work-group scopes 420-422 can continue to perform memory transactions on any of the unlocked cache lines.

Implementing the locking tables 430-433 to keep track of locking states at a per-address (or per-line) granularity allows independent RMW operations involving other addresses to proceed while the RMW lock is held for a remote scope operation. This also allows the use of banked lock control logic in some embodiments, since a single global ordering point for RMW lock requests is no longer needed. Per-line remote scope promotion supported by the locking tables 430-433 allows sub-operations required by the acquire/release semantics and the RMW atomicity requirements of the memory model to be decoupled. Consequently, some embodiments implement a command set that flushes and invalidates only the portions of the L2 cache 410 and the L1 caches 411-413 that are necessary to satisfy the requirements of the memory model. The command set can support parallelism that is not supported by remote scope promotion at a coarse granularity, such as the remote scope promotion supported by embodiments of the processing system 100 shown in FIG. 1. For example, on a remote device scope store, remote cores only need to flush the value of data stored at the promoted address (or addresses) rather than flushing all dirty data before the store is performed. For another example, broadcast locking commands and flushes of the local cash can be performed in parallel. The subsequent flush and invalidate operations for the remote cores can either be sent to remote cores immediately when they are ready (if latency is important) or together in the same remote core broadcast message (if network traffic is important).

TABLE 1

| Added Architectural Operations | Description |
| --- | --- |
| RMWtarget x L1 | If local RMW lock is not held for location x, and location x is Valid at L1, perform RMW on location x in the local L1 cache, else block |
| RMWtarget x L2 | If location x is Valid in L2 and the L2 RMW lock is not held for location x or is held by this thread, perform RMW on location x at L2, else block |
| ST x L2 | If x is not dirty in L1, perform a store operation at L2 (write through to L1) |
| FLU x all L1 | For all L1 caches, if location x contains dirty data flush it to the L2 cache |
| FLU other L1 | Flush all dirty data from all L1 caches EXCEPT the local L1 |
| INV x all L1 | Invalidate only the cache line containing x in all L1 caches |
| INV other L1 | Invalidate all data in all L1 caches EXCEPT the local L1 |
| LK rmw x all L1 | If it is not already held, acquire the RMW lock for location x at every L1 cache and the L2 cache, else block |
| UL rmw x all L1 | Release the RMW lock for location x at every L1 cache |

Table 1 lists targeted architectural operations that are used to implement locking (LK), unlocking (UL), store (ST), and read-modify-write (RMW) operations. The variable x shown in Table 1 indicates an address that indicates a memory location and may also be used to identify a cache line that holds a copy of the data stored at the memory location.

Figure 5:
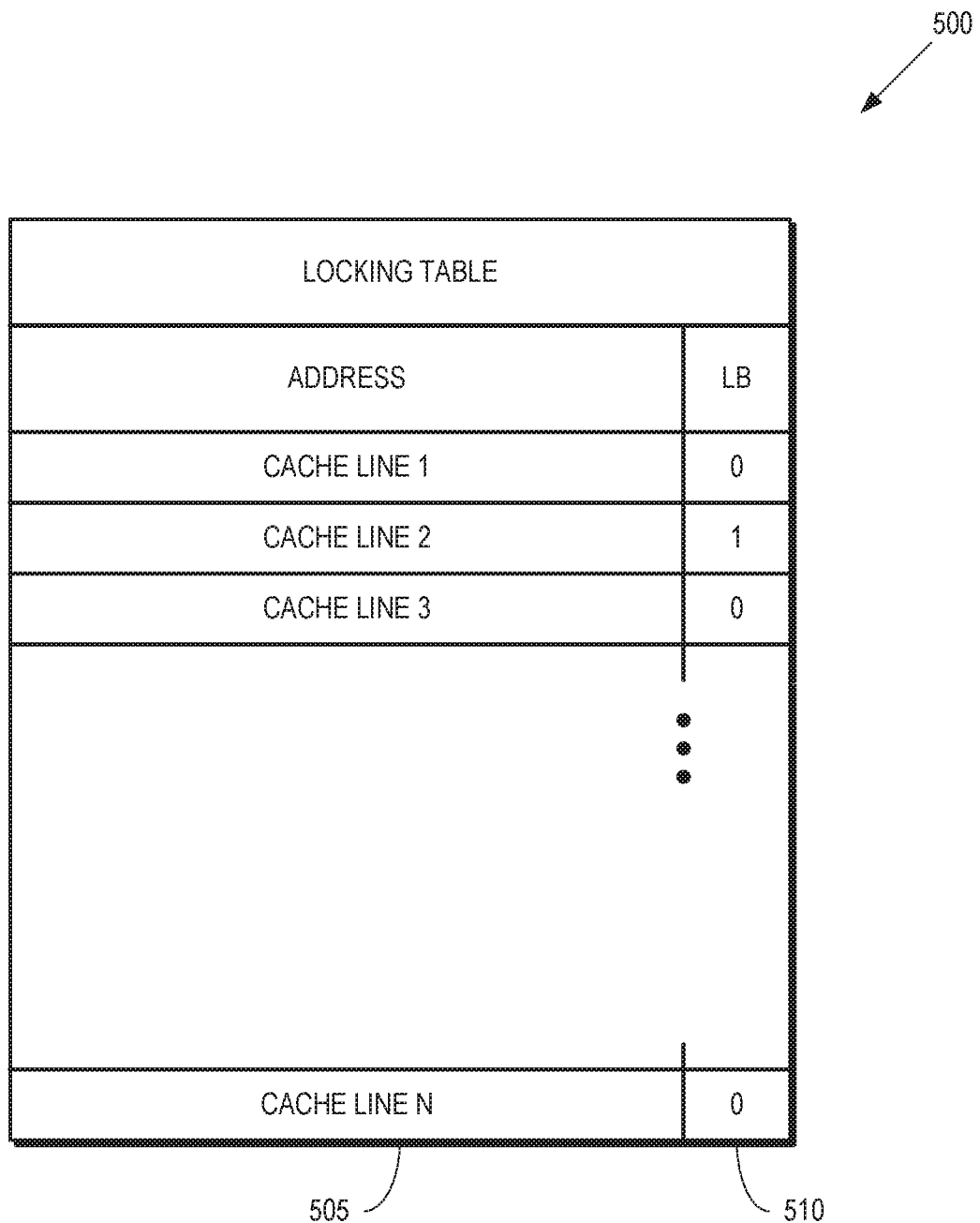
FIG. 5 is a diagram of a locking table according to some embodiments.

FIG. 5 is a diagram of a locking table 500 according to some embodiments. The locking table is used to implement some embodiments of the locking tables 430-433 shown in FIG. 4. The locking table 500 includes a column 505 that includes fields for storing addresses associated with the cache lines in the corresponding cache. In some variations, the column 505 also stores other information indicative of the addresses, such as cache tags. The locking table 500 also includes a column 510 for storing information that indicates the locking state of the corresponding line. In some embodiments, fields in the column 510 store a value of a lock bit (LB) that is set to a value of 0 to indicate that the corresponding cache line is unlocked and a value of 1 to indicate that the corresponding cache line is locked. The number of entries in the locking table 500 corresponds to the number of cache lines in the corresponding cache so that the locking state of each cache line can be determined on a per-line basis using the information stored in the locking table 500.

Figure 6:
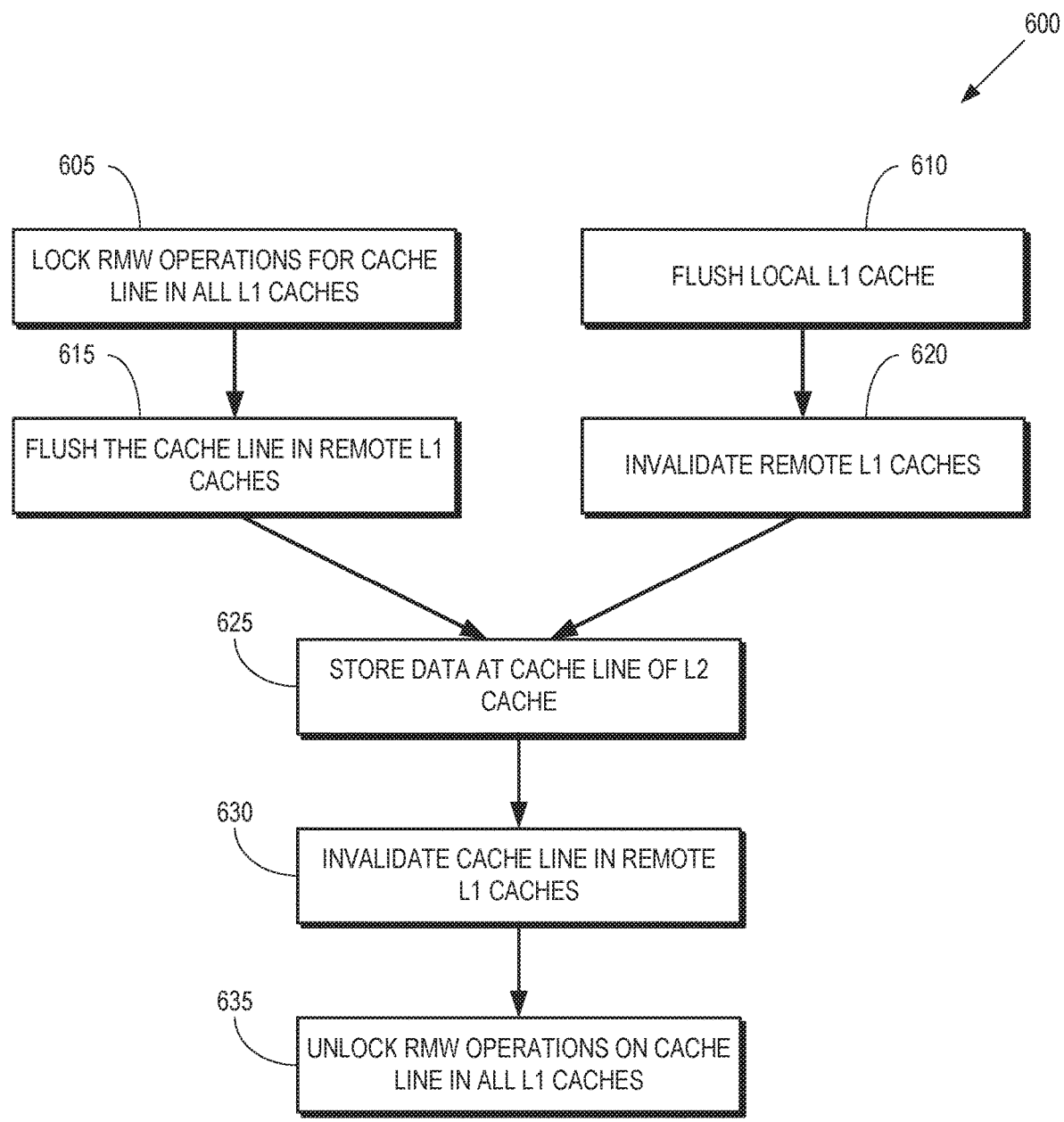
FIG. 6 is a flow diagram illustrating a method for implementing a remote device scope store operation on a per-line basis according to some embodiments.

FIG. 6 is a flow diagram illustrating a method 600 for implementing a remote device scope store operation on a per-line basis according to some embodiments. The method is implemented in some embodiments of the processing unit 400 shown in FIG. 4. As discussed herein, memory model rules define a release semantic and RMW atomicity requirements that must be followed for any remote device scope operations. These requirements can be met, while increasing the exposed parallelism of the underlying operations, by implementing remote scope promotion on a per-line basis, e.g., using a locking table such as the locking tables 430-433 shown in FIG. 4 and the locking table 500 shown in FIG. 5. The method 600 is discussed in terms of a store operation that operates on a first line indicated by a first address. However, some embodiments of the method 600 are also applied to sets of lines indicated by sets of addresses or an address range. Some embodiments of the method 600 are implemented at other levels of a cache hierarchy.

At block 605, the local core (e.g., a local processing element implemented by a local compute unit) acquires the RMW locks for cache lines in the local and remote caches that are indicated by the first address. For example, the local core can broadcast a lock command that indicates the first address to the local and remote caches. If a copy of data stored at the first address is cached in the local or remote caches, the locking state of the corresponding cache line is set to "locked" using a corresponding entry in the locking table associated with the local or remote cache. The locking state of other cache lines in the local and remote caches may remain in their previous locking state, which may be locked or unlocked. At block 610, the local L1 cache associated with the local core is flushed so that dirty data in the local L1 cache is written to the higher level, L2 cache that provides synchronization at the device scope. The requirements of the memory model do not require that the blocks 605 and 610 be performed sequentially. The blocks 605 and 610 can therefore be performed concurrently or in parallel.

At block 615, dirty data is flushed from cache lines indicated by the first address in the remote L1 caches associated with the remote cores, remote processing elements, or remote compute units. Other cache lines (i.e., the cache lines that are not indicated by the first address) are not flushed from the remote L1 caches and dirty data may remain in these cache lines. In some embodiments, a full flush of all dirty data in the remote L1 caches is performed if a per-address flush operation is not supported. At block 620, all the cache lines in the remote L1 caches are invalidated. The memory model does not require that flushing data from the remote L1 caches be performed sequentially with invalidating data in the remote caches. The blocks 615 and 620 can therefore be performed concurrently or in parallel.

At block 625, the local core stores data at a cache line in the higher level L2 cache based on the first address. The memory model requires that the data at the cache line indicated by the first address be propagated to the local and remote L1 caches. The cache lines indicated by the first address in the remote L1 caches are therefore invalidated at block 630. The memory model does not require that the other cache lines in the remote L1 caches be invalidated as part of block 630. In some embodiments, a full invalidate of the remote L1 caches may be performed if a per-cache-line invalidate operation is not supported.

At block 635, the local core unlocks RMW operations on cache lines indicated by the first address in the local and remote L1 caches. For example, the local core can broadcast an unlock command that indicates the first address to the local and remote L1 caches. If a copy of data stored at the first address is cached in the local or remote L1 caches, the locking state of the corresponding cache line is set to "unlocked" using a corresponding entry in the locking table associated with the local or remote L1 cache. The locking state of other cache lines in the local and remote L1 caches can remain in their previous locking state, which may be locked or unlocked.

Figure 7:
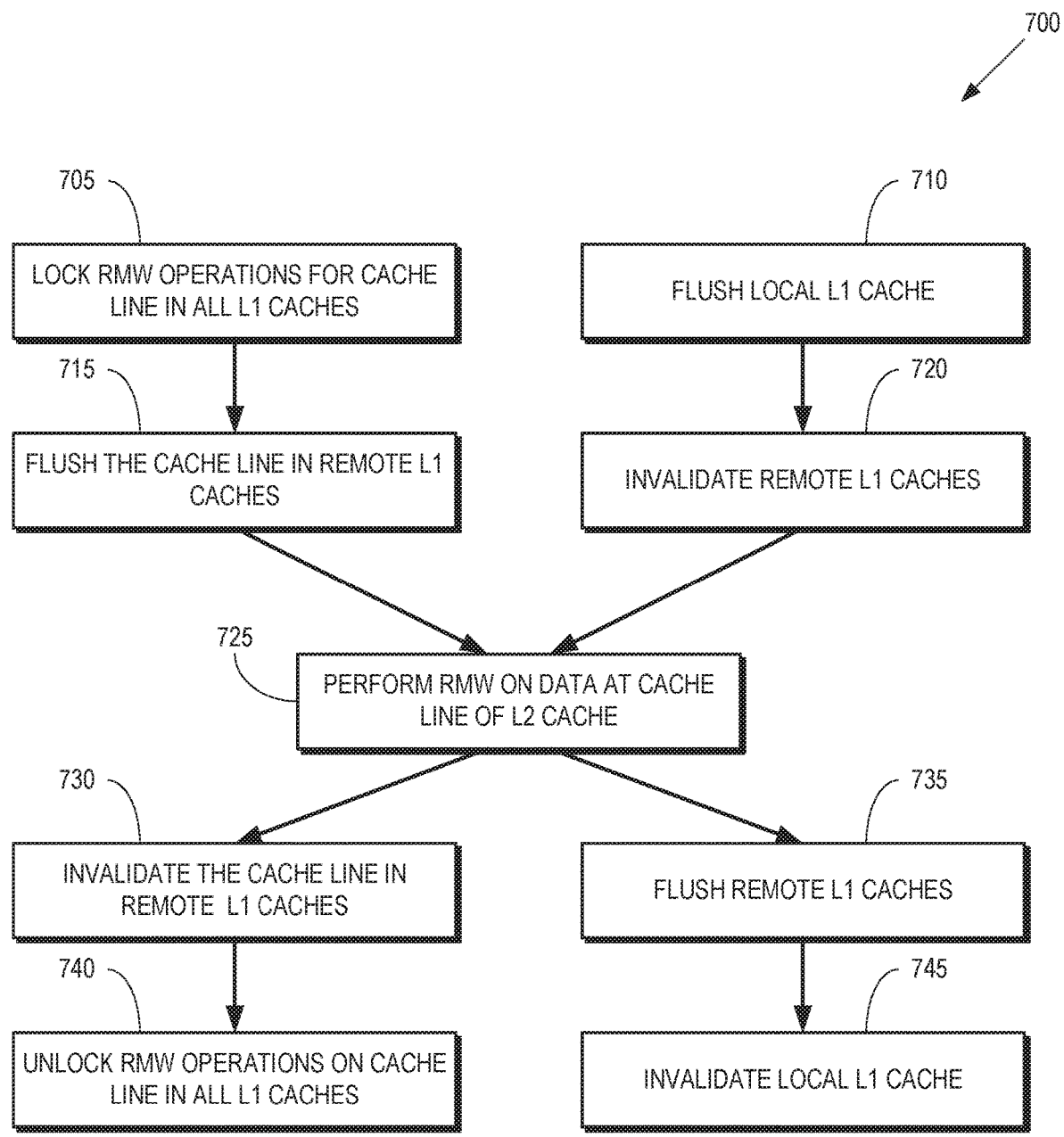
FIG. 7 is a flow diagram illustrating a method for implementing a remote device scope RMW-acquire operation on a per-line basis according to some embodiments.

FIG. 7 is a flow diagram illustrating a method 700 for implementing a remote device scope RMW-acquire operation on a per-line basis according to some embodiments. The method is implemented in some embodiments of the processing unit 400 shown in FIG. 4. As discussed herein, memory model rules define a release semantic, and acquire semantic, and RMW atomicity requirements. These requirements can be met, while increasing the exposed parallelism of the underlying operations, by implementing remote scope promotion on a per-line basis, e.g., using a locking table such as the locking tables 430-433 shown in FIG. 4 and the locking table 500 shown in FIG. 5. The method 700 is discussed in terms of a store operation that operates on a first line indicated by a first address. However, some embodiments of the method 700 may also be applied to sets of lines indicated by sets of addresses or an address range.

At block 705, the local core acquires the RMW locks for cache lines in the local and remote L1 caches that are indicated by the first address. As discussed herein, the RMW locks can be acquired by broadcasting a locking command that indicates the first address. Corresponding entries in the locking tables for the local and remote L1 caches are then set to a locked or unlocked value depending on whether a copy of the data stored at the first address is cached in the local or remote L1 caches. At block 710, the local L1 cache associated with the local core is flushed so that dirty data in the local L1 cache is written to the higher level, L2 cache that provides synchronization at the device scope. The requirements of the memory model do not require that blocks 705 and 710 be performed sequentially. The blocks 705 and 710 can therefore be performed concurrently or in parallel.

At block 715, dirty data is flushed from cache lines indicated by the first address in the remote L1 caches. Other cache lines (i.e., the cache lines that are not indicated by the first address) are not flushed from the remote L1 caches and dirty data may remain in these cache lines. In some embodiments, a full flush of all dirty data in the remote L1 caches is performed if a per-address flush operation is not supported. At block 720, all the cache lines in the remote L1 caches are invalidated. The memory model does not require that flushing data from the remote L1 caches be performed sequentially with invalidating data in the remote L1 caches. The blocks 715 and 720 can therefore be performed concurrently or in parallel.

At block 725, the local core performs a RMW operation on data at a cache line in the higher level L2 cache based on the first address. The RMW atomicity requires that the effects of the RMW operation performed at block 720 on the cache line indicated by the first address be propagated to the remote cores in the device scope before a subsequent RMW operation is performed by the local core. The cache line indicated by the first address is therefore invalidated in the remote L1 caches at block 730 so that the remote cores operate on the most up-to-date data stored at the first address. In some embodiments, a full invalidate of the remote L1 caches is performed if a per-cache-line invalidate operation is not supported. The acquire semantics require that all data at the device scope, including all data in the remote L1 caches, is visible to the local core. The remote L1 caches are therefore flushed at block 735. The blocks 730 and 735 can be performed concurrently or in parallel without violating any restrictions of the memory model.

At block 740, the local core unlocks RMW operations on cache lines indicated by the first address in the local and remote L1 caches. For example, as discussed herein, some variations of the local core broadcast an unlock command that indicates the first address and the local and remote L1 caches can selectively modify the locking states of cache lines that store copies of the data from the first address. At block 745, the local L1 cache is invalidated. Invalidating the local L1 cache forces the local L1 cache to access the most up-to-date data, including the data at the cache line indicated by the first address, from the higher level L2 cache. The blocks 740 and 745 can be performed in parallel without violating any restrictions of the memory model.

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium can include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    at least one first lock table associated with at least one first cache; and
    at least one processing unit, wherein each processing unit comprises:
        a plurality of second lock tables associated with a plurality of second caches, wherein the at least first lock table and each of the plurality of second lock tables indicate locking states of addresses of cache lines in the at least one first cache and the plurality of second caches, respectively, on a per-line basis, wherein, on a per-line basis, at least one address in a second cache of the plurality of second caches is concurrently flushed and all cache lines in the second cache are invalidated, while addresses in the second cache that are not indicated by the at least one address are not flushed while the at least one address is locked.

2. The apparatus of claim 1, further comprising:
    a plurality of compute units for concurrently executing work-groups of work items,
    wherein the plurality of second caches is associated with the plurality of compute units and is configured in a hierarchy with the at least one first cache, and
    wherein each of the plurality of compute units comprises a plurality of processing elements for concurrently executing work items.

3. The apparatus of claim 2, wherein each of the plurality of compute units is configured to synchronize execution of the plurality of processing elements in the compute unit at a first scope using a corresponding second cache of the second plurality of caches.

4. The apparatus of claim 3, wherein execution of the plurality of compute units is selectively synchronized on a per-line basis at a second scope that encompasses the first scopes of the plurality of compute units using the at least one first cache, the at least one first lock table, and the plurality of second lock tables.

5. The apparatus of claim 4, wherein the plurality of compute units further includes a local compute unit and at least one remote compute unit, and wherein the local compute unit is configured to modify the at least one first lock table and at least one second lock table of the plurality of second lock tables to lock, on a per-line basis, addresses of cache lines for use by the local compute unit.

6. The apparatus of claim 5, wherein the local compute unit is configured to flush, on a per-line basis, dirty data from the plurality of second caches, and wherein the local compute unit is configured to flush all dirty data from at least one of the plurality of second caches that is associated with the at least one remote compute unit.

7. The apparatus of claim 6, wherein the local compute unit is configured to invalidate, on a per-line basis, cache lines in the plurality of second caches, and wherein the local compute unit is configured to invalidate all cache lines in the at least one of the plurality of second caches that is associated with the at least one remote compute unit.

8. The apparatus of claim 7, wherein the local compute unit is configured to perform a remote device scope store operation by:
    concurrently locking, on a per-line basis using the at least one first lock table and at least one second lock table of the plurality of second lock tables, at least one address of at least one cache line in the plurality of second caches and flushing a second cache of the plurality of second caches associated with the local compute unit, wherein the at least one address is associated with the remote device scope store operation;
    concurrently flushing, on a per-line basis, at least one address in the at least one of the plurality of second caches that is associated with the at least one remote compute unit and invalidating all cache lines in the at least one of the plurality of second caches that is associated with the at least one remote compute unit;
    storing data at the at least one address in the at least one first cache;
    invalidating, on a per-line basis, the at least one address in the at least one second cache associated with the at least one remote compute unit; and
    unlocking, on a per-line basis using the at least one first lock table and the plurality of second lock tables, the at least one address in the plurality of second caches.

9. The apparatus of claim 7, wherein the local compute unit is configured to perform a remote device scope read-modify-write (RMW) operation by:
    concurrently locking, on a per-line basis using the at least one first lock table and the plurality of second lock tables, at least one address of at least one cache line in the plurality of second caches and flushing a second cache of the plurality of second caches associated with the local compute unit;
    concurrently flushing, on a per-line basis, at least one address in the at least one second cache associated with the at least one remote compute unit and invalidating all cache lines in the at least one second cache associated with the at least one remote compute unit;
    performing the RMW operation on data at the at least one address in the at least one first cache;
    concurrently invalidating, on a per-line basis, the at least one address in the at least one second cache associated with the at least one remote compute unit and flushing the at least one second cache associated with the at least one remote compute unit; and concurrently unlocking, on a per-line basis using the at least one first lock table and the plurality of second lock tables, the at least one address of the at least one cache line in the plurality of second caches and invalidating the second cache associated with the local compute unit.

10. A method, comprising:

selectively synchronizing, on a per-line basis, threads executed by a first processing element and a second processing element using a third cache based on locking states of addresses of cache lines in a first cache and a second cache, wherein the locking states are indicated by first and second lock tables for the first and second caches, and wherein the third cache is at a higher level in a cache hierarchy that includes the first and second caches, wherein selectively synchronizing the threads comprises:

concurrently flushing, on a per-line basis, at least one address in the second cache and invalidating all cache lines in the second cache, while not flushing addresses in the second cache that are not indicated by the at least one address while the at least one address is locked.

11. The method of claim 10, further comprising:

synchronizing threads executed by first processing elements in a first compute unit using the first cache; and
synchronizing threads executed by second processing elements in a second compute unit using the second cache; wherein selectively synchronizing the threads executed by the first and second processing elements further comprises at least one of:
storing data at the at least one address in the first cache; and
performing a read-modify-write (RMW) operation on data at the at least one address in the first cache.

12. The method of claim 11, wherein selectively synchronizing the threads executed by the first and second processing elements further comprises:

invalidating, on a per-line basis, the at least one address in the second cache; and
unlocking, on a per-line basis using the first and second lock tables, the at least one address of the at least one cache line in the first and second caches.

13. The method of claim 11, wherein selectively synchronizing the threads executed by the first and second processing elements further comprises:

concurrently invalidating, on a per-line basis, the at least one address in the second cache and flushing the second cache; and
concurrently unlocking, on a per-line basis using the first and second lock tables, the at least one address of the at least one cache line in the first and second caches and invalidating the first cache.

14. A non-transitory computer readable storage medium embodying a set of executable instructions, the set of executable instructions to manipulate a computer system to perform a portion of a process to fabricate at least part of a processor, the processor comprising:

at least one first lock table associated with at least one first cache; and
at least one processing unit, wherein each processing unit comprises:
a plurality of second lock tables associated with a plurality of second caches, wherein the at least first lock table and each of the plurality of second lock tables indicate locking states of addresses of cache lines in the at least one first cache the plurality of second caches on a per-line basis, wherein, on a per-line basis, at least one address of a second cache of the plurality of second caches is concurrently flushed and all cache lines in the second cache are invalidated, while addresses in the second cache that are not indicated by the at least one address are not flushed while the at least one address is locked.

15. The non-transitory computer readable storage medium of claim 14, further comprising:

a plurality of compute units for concurrently executing work-groups of work items,
wherein the plurality of second caches is associated with the plurality of compute units and is configured in a hierarchy with the at least one first cache, and
wherein each of the plurality of compute units comprises a plurality of processor elements for concurrently executing work items, wherein each of the plurality of compute units is configured to synchronize execution of the plurality of processor elements in the compute unit at a first scope using a using the corresponding second cache of the second plurality of caches, and wherein execution of the plurality of compute units is selectively synchronized on a per-line basis at a second scope that encompasses the first scopes of the plurality of compute units using the at least one first cache, the at least one first lock table, and the first plurality of second lock tables.

16. The non-transitory computer readable storage medium of claim 15, wherein the plurality of compute units further includes a local compute unit and at least one remote compute unit, wherein the local compute unit is configured to modify the at least one first lock table and at least one second lock table of the plurality of second lock tables to lock, on a per-line basis, addresses of cache lines for use by the local compute unit, wherein the local compute unit is configured to flush, on a per-line basis, dirty data from the plurality of second caches, wherein the local compute unit is configured to flush all dirty data from at least one of the plurality of second caches associated with the at least one remote compute unit, wherein the local compute unit is configured to invalidate, on a per-line basis, cache lines in the plurality of second caches, and wherein the local compute unit is configured to invalidate all cache lines in the at least one of the plurality of second caches associated with the at least one remote compute unit.

* * * * *

UNITED STATES PATENT AND TRADEMARK OFFICE
CERTIFICATE OF CORRECTION

| | |
|---|---|
| PATENT NO. | : 11,042,484 B2 |
| APPLICATION NO. | : 15/192542 |
| DATED | : June 22, 2021 |
| INVENTOR(S) | : Johnathan R. Alsop and Bradford Beckmann |

It is certified that error appears in the above-identified patent and that said Letters Patent is hereby corrected as shown below:

In the Claims

At Column 16 Line 32, Claim 15, please delete "using the" after "a" and before "corresponding"

Signed and Sealed this
Seventh Day of March, 2023

*Katherine Kelly Vidal*

Katherine Kelly Vidal
*Director of the United States Patent and Trademark Office*